United States Patent Office 3,466,363
Patented Sept. 9, 1969

3,466,363
METHOD OF TREATING ANIMALS INFECTED WITH LARGE ROUNDWORMS USING COBALT ARSENIC COMPOUNDS
Orley J. Mayfield, Charles City, Iowa, assignor, by mesne assignments, to Kewanee Oil Company, Bryn Mawr, Pa., a corporation of Delaware
No Drawing. Filed July 23, 1965, Ser. No. 474,491
Int. Cl. A61k 25/00
U.S. Cl. 424—295                         1 Claim

ABSTRACT OF THE DISCLOSURE

This invention comprises a composition suitable for any method of treating animals infected with large roundworms comprising a feed composition containing water and cobalt arsenate, cobalt arsanilate, or cobalt phenylarsonate.

---

This invention relates to the prevention of roundworms, especially large roundworms in domestic animals and poultry, such as chickens, turkeys, etc. By preventing the large roundworms, I am able to prevent diseases which are caused by parasites on the large roundworms. By "prevention' of roundworms, I mean that they are subjected to a dosage of a therapeutic agent at a plurality of intervals and in amounts sufficient to kill a sufficient number, or all of such roundworms so that the infestation of the animal or poultry is avoided, cured, or controlled.

The therapeutic agent which I prefer to use for preventing roundworm infestation is cobalt arsanilate. I may also use any of the cobalt salts of phenylarsonic acids, preferably those which are substituted on the ring by a halogen group, a methyl group, a phenyl group, a chlorophenyl group, a nitro group, a hydroxy group, a ureido group, or a plurality of such groups and mixtures thereof, and cobalt arsinoxide. Also included is cobalt arsenate.

The parasites against which said cobalt compounds set forth above are effective are those known as large roundworms, such as the Ascaridia, especially *Ascaridia galli*, and the Heterakidae, especially heterakis gallinae.

The cobalt arsanilate, although milder to the domestic animal and more palatable, at the same concentration than, for example, the sodium salt, is no less effective. Indeed it is more effective for preventing large roundworms than the corresponding sodium salt.

Arsanilic acid and its sodium salt have been suggested heretofore but not the cobalt salt. On the organic side the art has grown toward the phenylarsonates. On the metal side, sodium salts have been preferred while cobalt is little noticed. So far as applicant is aware, nobody has previously used cobalt arsanilate as a coccidosis control through roundworm control.

The quantity of cobalt arsanilate to be used can vary with respect to the weight of the basic feed compositions. The concentration of cobalt arsanilate should be such that when the bird eats the basic food ration ad libitum, it will receive the correct dosage of the cobalt arsanilate. In general, poultry should receive a dosage in the range of from one-fourth of a pound to one pound per ton of dry solid feed or an equivalent amount if supplied by way of edible oil, or other feed, or water. These equivalent dosages can be calculated easily by the formulator and indicated suitably on the containers.

It is an object of the present invention to provide a novel and effective therapeutic treatment for large roundworms in poultry.

It is another object to provide a proper dosage of cobalt for obtaining freedom from or partial freedom from the parasite without damage to the poultry being treated.

Another object is to produce a therapeutic composition having prophylactic properties relative to poultry roundworm disease and which is adapted for oral ingestion with feedstuff or drinking water.

A still further object is to provide a medicament for roundworm control which is palatable to poultry.

Other objects of the invention will become obvious as the description proceeds, it being understood that this description is not limiting as to the scope of the invention.

In place of cobalt arsanilate, arsanilic acid and cobalt sulfate may be used together. These compounds may be mixed and then added to the feed or drinking water. It is, however, not necessary to mix the cobalt and the arsanilic acid. It is enough if both are added and eventually mixed with the feed. Obviously, it is preferable to mix the feed and additives at the time the feed is compounded. This should give a uniform mix and reaction will take place upon ingestion of the mixture, if not before.

The following examples will serve to illustrate the invention:

EXAMPLE I

This experiment was conducted to determine the value of cobalt arsenate and cobalt arsanilate in the prevention of roundworm (Ascaridia) infestation when administered at the ½ pound per ton level in feed. 75-day-old chicks were randomized by the card shuffle method, weighed, wingbanded, and divided into three groups of 25 chicks each. Group I was given untreated feed and held as a control; group II was given feed otherwise the same but containing cobalt arsanilate at the above-mentioned level; group III was given feed containing cobalt arsenate at the above-mentioned level. All chicks were given embryonated Ascaridia ova on the first, seventh, and fourteenth day of the test. The total number of worms per group was determined by postmortem examination at the end of the fourth week. There were 14 worms present in group I; 8 worms present in group II; and no worms present in group III. Hence, the efficacy of cobalt arsanilate was nearly 50 percent, while that for cobalt arsenate was 100 percent.

GROUP I

| Bird No. | Weighing dates and wts. in grams | | | | | Ascaridia PM exam., No. worms |
|---|---|---|---|---|---|---|
| | 5/3 | 5/10 | 5/17 | 5/24 | 5/31 | |
| 295 | 36 | 76 | 136 | 253 | 401 | 2 |
| 300 | 35 | 56 | 100 | 205 | 334 | 0 |
| 961 | 35 | 75 | 120 | 208 | 312 | 1 |
| 964 | 36 | 75 | 145 | 255 | 357 | 1 |
| 976 | 33 | 65 | 126 | 221 | 354 | 0 |
| 979 | 32 | 60 | 120 | 225 | 354 | 0 |
| 980 | 33 | 61 | 130 | 235 | 372 | 0 |
| 984 | 34 | 55 | 122 | 223 | 341 | 1 |
| 987 | 38 | 76 | 138 | 236 | 364 | 1 |
| 994 | 37 | 78 | 140 | 239 | 392 | 1 |
| 997 | 33 | 80 | 143 | 255 | 384 | 1 |
| 1,486 | 37 | 58 | 112 | 214 | 340 | 0 |
| 1,492 | 38 | 68 | 138 | 263 | 420 | 0 |
| 1,494 | 34 | 70 | 128 | 209 | 322 | 0 |
| 1,495 | 40 | 72 | 132 | 235 | 360 | 0 |
| 1,496 | 38 | 61 | 123 | 238 | 374 | 0 |
| 1,497 | 32 | 63 | 125 | 236 | 384 | 0 |
| 1,499 | 35 | 75 | 125 | 234 | 360 | 0 |
| 1,088 | 39 | 85 | 152 | 270 | 424 | 0 |
| 1,090 | 39 | 76 | 125 | 233 | 356 | 0 |
| 1,092 | 35 | 51 | 110 | 208 | 328 | 0 |
| 1,096 | 32 | 63 | 125 | 220 | 344 | 0 |
| 1,390 | 35 | 71 | 133 | 230 | 360 | 2 |
| 1,391 | 39 | 62 | 105 | 135 | 290 | 4 |
| 1,392 | 37 | Died 5/8/ navel infection | | | | |
| Total | 892 | 1,642 | 3,053 | 3,480 | 8,639 | 14 |
| Avg. wt | 35.68 | 68.22 | 127.20 | 228.74 | 359.87 | |

The total feed consumption for the above group for the time period of the test was 34 pounds 9 ounces.

GROUP II

| Bird No. | Weighting dates and wts. in grams | | | | | Ascaridia PM exam., No. worms |
|---|---|---|---|---|---|---|
| | 5/3 | 5/10 | 5/17 | 5/24 | 5/31 | |
| 296 | 38 | 78 | 140 | 245 | 382 | 0 |
| 297 | 38 | 80 | 150 | 258 | 386 | 0 |
| 299 | 40 | 75 | 140 | 252 | 368 | 0 |
| 860 | 31 | 72 | 138 | 236 | 372 | 0 |
| 962 | 31 | 79 | 145 | 250 | 374 | 1 |
| 963 | 35 | 58 | 100 | 181 | 292 | 0 |
| 981 | 35 | 65 | 112 | 222 | 347 | 0 |
| 985 | 38 | 86 | 158 | 275 | 429 | 2 |
| 988 | 41 | 80 | 145 | 245 | 390 | 0 |
| 989 | 35 | 59 | 118 | 208 | 322 | 0 |
| 990 | 40 | 68 | 122 | 229 | 366 | 0 |
| 992 | 38 | 82 | 153 | 263 | 408 | 0 |
| 965 | 33 | 73 | 136 | 242 | 379 | 0 |
| 996 | 37 | 80 | 145 | 260 | 403 | 2 |
| 999 | 38 | 63 | 123 | 221 | 351 | 0 |
| 1,000 | 33 | 68 | 125 | 243 | 369 | 1 |
| 998 | 41 | 82 | 143 | 239 | 376 | 0 |
| 1,487 | 45 | 89 | 155 | 290 | 417 | 0 |
| 1,490 | 49 | 75 | 115 | 200 | 303 | 0 |
| 1,493 | 40 | 76 | 133 | 232 | 343 | 0 |
| 1,498 | 32 | 58 | 108 | 205 | 314 | 0 |
| 1,500 | 35 | 69 | 118 | 210 | 321 | 1 |
| 1,087 | 38 | 71 | 123 | 225 | 339 | 0 |
| 1,100 | 38 | 75 | 138 | 235 | 377 | 0 |
| 1,393 | 35 | 68 | 138 | 235 | 374 | 1 |
| Total wt | 934 | 1,829 | 3,321 | 5,901 | 9,102 | 8 |
| Avg. wt | 37.36 | 73.16 | 132.84 | 236.0 | 364.08 | |

The total feed consumption for the above group for the time period of the test was 36 pounds 12 ounces.

GROUP III

| Bird No. | Weighting dates and wts. in grams | | | | | Ascaridia PM exam., No. worms |
|---|---|---|---|---|---|---|
| | 5/3 | 5/10 | 5/17 | 5/24 | 5/31 | |
| 294 | 39 | 60 | 118 | 210 | 339 | 0 |
| 298 | 40 | 68 | 116 | 188 | 300 | 0 |
| 966 | 35 | 65 | 116 | 185 | 298 | 0 |
| 977 | 35 | 67 | 112 | 190 | 300 | 0 |
| 978 | 36 | 72 | 128 | 208 | 327 | 0 |
| 982 | 35 | 68 | 126 | 212 | 321 | 0 |
| 983 | 35 | 64 | 115 | 192 | 308 | 0 |
| 986 | 38 | 65 | 116 | 202 | 331 | 0 |
| 991 | 35 | 49 | 90 | 158 | 269 | 0 |
| 993 | 36 | 61 | 113 | 200 | 312 | 0 |
| 995 | 40 | 64 | 115 | 185 | 294 | 0 |
| 1,485 | 33 | 58 | 116 | 206 | 228 | 0 |
| 1,488 | 35 | 48 | 100 | 180 | 294 | 0 |
| 1,489 | 34 | 52 | 107 | 185 | 305 | 0 |
| 1,491 | 39 | 68 | 125 | 222 | 258 | 0 |
| 1,089 | 35 | 52 | 105 | 165 | 145 | 0 |
| 1,091 | 37 | 68 | 126 | 205 | 323 | 0 |
| 1,093 | 38 | 66 | 124 | 212 | 338 | 0 |
| 1,094 | 35 | 65 | 124 | 212 | 338 | 0 |
| 1,095 | 35 | 16 | 136 | 223 | 345 | 0 |
| 1,097 | 35 | Died 5/4 navel infection | | | | |
| 1,098 | 49 | 62 | 108 | 195 | 283 | 0 |
| 1,099 | 35 | 68 | 125 | 210 | 328 | 0 |
| 1,389 | 35 | 70 | 125 | 210 | 333 | 0 |
| 1,394 | 42 | 72 | 130 | 218 | 338 | 0 |
| Total wt | 812 | 1,528 | 2,810 | 4,747 | 7,317 | 0 |
| Avg. wt | 36.48 | 63.66 | 117.0 | 137.79 | 304.87 | |

The total feed consumption for the above group for the time period of the test was 34 pounds.

EXAMPLE II 75-day-old chicks were randomized by the card shuffle method, weighed, wingbanded, and divided into three groups of 25 chicks each. One group was given untreated feed and held as a control; another group was fed the same food to which had been added cobalt arsenate in the ratio of ¼ lb. per ton of feed; a third group was given the same food containing cobalt arsanilate in the ratio of ½ lb. per ton of food. All chicks were given embryonated *Ascaridia galli* (roundworm) at the beginning of the test, and again a week after it started. The birds receiving cobalt arsenate contained 39 worms compared with 65 in the control, equivalent to 40% efficacy. The birds treated with cobalt arsanilate contained 16 worms compared with 65 in the control, or 75% efficacy.

EXAMPLE III

This experiment was conducted to determine the value of cobalt arsanilate in preventing infestation with roundworms in comparison to sodium arsanilate. One hundred-day-old chicks were randomized by the card shuffle method, wingbanded, and weighed, and placed in four groups of 25 each. Group 1 was a control on regular feed; group 2 received feed containing cobalt arsanilate at the rate of ¾ lb. per ton; group 3 received feed containing cobalt arsanilate at the level of 1 lb. per ton; group 4 received feed containing sodium arsanilate at 1 lb. per ton. The birds were given embryonated ascarida at one day and seven days of age. The dosage of ascaridia ova was too heavy (approximately 400) at one day of age, and killed several of the birds. The dosage was reduced to approximately 100 ova per chick on the seventh day. The test was discontinued at six weeks. Postmortem examination showed 72 roundworms in the control group, 51 worms in the group receiving ¾ lb. per ton of cobalt arsanilate, 14 roundworms in the group receiving feed containing 1 lb. per ton cobalt arsanilate, and group 4 showed 125 roundworms. The efficacy of cobalt arsanilate at ¾ lb. per ton was 40%; at 1 lb. per ton, 80%; while that of sodium arsanilate was zero. Evidently, the normal resistance of the bird was undermined in the case of group 4.

EXAMPLE IV

Cobalt arsanilate (growth test)

Purpose: To determine the value of cobalt arsanilate as a growth stimulant when administered at 45, 90, and 180 grams per ton of feed.

Procedure: 100-day-old chicks were weighed, wingbanded, and randomized by the card shuffle method into four groups.

Medication: Birds were given the following medication:

Group I—1.68 grams cobalt arsanilate in 75 lb. feed (45 gram ton)

Group II—3.37 grams cobalt arsanilate in 75 lb. feed (90 gram ton)

Group III—6.74 grams cobalt arsanilate in 75 lb. feed (180 gram ton)

Group IV—straight feed, 75 lbs.

All birds were fed the following feed formula:

Yellow corn meal _____pounds__ 200
44% soybean meal _____do____ 70
Fish meal _____do____ 15
Alfalfa meal _____do____ 15
Bone meal _____do____ 3
Limestone _____do____ 6
Iodized salt _____do____ 2
Vitamin A, I.U. _____ 800,000
Vitamin $D_3$, I.U. _____ 175,000
Vitamin $B_1$ _____mg__ 180
Niacin _____mg__ 2,200
Riboflavin _____mg__ 480
Pantothenic _____mg__ 450
Choline _____mg__ 24
Vitamin $B_{12}$ _____mg__ 5
Vitamin E, I.U. _____ 100

Conclusion:

Group I with 45 grams per ton made a 2% gain over the controls.

Group II with 90 grams per ton made a 1½% gain over the controls.

Group III with 180 grams per ton made a 6% gain over the controls.

GROUP I

| Bird No. | Weighing dates and weights in grams | | | | | |
|---|---|---|---|---|---|---|
| | 10/18 | 10/25 | 11/1 | 11/8 | 11/15 | 11/22 |
| 2 | 40 | 88 | 170 | 312 | 515 | 695 |
| 5 | 41 | 95 | 173 | 298 | 455 | 585 |
| 10 | 34 | 83 | 156 | 266 | 425 | 566 |
| 13 | 48 | 104 | 193 | 330 | 498 | 655 |
| 37 | 57 | 95 | 175 | 304 | 484 | 625 |
| 38 | 44 | 100 | 185 | 226 | 518 | 702 |
| 44 | 38 | 90 | 173 | 296 | 462 | 612 |
| 45 | 38 | 92 | 165 | 283 | 435 | 566 |
| 46 | 43 | 95 | 168 | 292 | 420 | 466 |
| 48 | 42 | 96 | 178 | 310 | 492 | 670 |
| 59 | 35 | 76 | 146 | 258 | 390 | 512 |
| 61 | 43 | 105 | 200 | 335 | 516 | 682 |
| 65 | 40 | 94 | 185 | 324 | 518 | 695 |
| 68 | 42 | 104 | 183 | 302 | 482 | 652 |
| 71 | 40 | 90 | 155 | 325 | 516 | 684 |
| 72 | 40 | 78 | 150 | 276 | 438 | 580 |
| 73 | 40 | 82 | 170 | 256 | 388 | 508 |
| 76 | 44 | 94 | 163 | 296 | 470 | 632 |
| 78 | 39 | 85 | 190 | 280 | 440 | 592 |
| 82 | 40 | 98 | 180 | 335 | 530 | 686 |
| 83 | 35 | 92 | 168 | 314 | 480 | 648 |
| 88 | 37 | 94 | 150 | 286 | 438 | 572 |
| 90 | 41 | 86 | 172 | 265 | 405 | 515 |
| 96 | 45 | 95 | 153 | 282 | 412 | 498 |
| 97 | 41 | 92 | 183 | 258 | 405 | 528 |
| Total wt | 10,077 | 2,304 | 4,284 | 7,409 | 11,542 | 15,111 |
| Avg. wt | 40.20 | 92.16 | 171.36 | 296.36 | 461.48 | 604.64 |

The total food consumption for the above group for the time period of the test was 77 pounds.

GROUP II

| Bird No. | Weighing dates and weights in grams | | | | | |
|---|---|---|---|---|---|---|
| | 10/18 | 10/25 | 11/1 | 11/8 | 11/15 | 11/22 |
| 3 | 35 | 72 | 143 | 252 | 405 | 522 |
| 15 | 34 | 72 | 150 | 263 | 422 | 444 |
| 16 | 40 | 80 | 145 | 246 | 388 | 493 |
| 24 | 40 | 90 | 170 | 292 | 468 | 628 |
| 26 | 40 | Died 10/23 wry-neck, cecal core | | | | |
| 30 | 40 | 92 | 176 | 305 | 475 | 635 |
| 40 | 39 | 80 | 160 | 270 | 425 | 558 |
| 35 | 37 | 82 | 165 | 275 | 438 | 568 |
| 42 | 41 | 88 | 165 | 282 | 444 | 610 |
| 43 | 41 | 92 | 170 | 282 | 424 | 535 |
| 47 | 44 | 100 | 196 | 335 | 514 | 645 |
| 50 | 42 | 96 | 195 | 340 | 510 | 662 |
| 51 | 42 | 93 | 194 | 333 | 518 | 653 |
| 53 | 40 | 90 | 162 | 273 | 422 | 562 |
| 64 | 40 | 90 | 170 | 300 | 484 | 446 |
| 66 | 39 | 90 | 175 | 305 | 578 | 705 |
| 69 | 37 | 95 | 183 | 315 | 492 | 645 |
| 75 | 39 | 100 | 180 | 298 | 488 | 670 |
| 79 | 34 | 73 | 135 | 230 | 360 | 465 |
| 81 | 35 | 92 | 173 | 296 | 472 | 610 |
| 89 | 38 | 96 | 180 | 310 | 485 | 632 |
| 93 | 37 | Died 10/22 starvation | | | | |
| 94 | 43 | 108 | 205 | 345 | 562 | 755 |
| 95 | 38 | 95 | 182 | 312 | 486 | 615 |
| 98 | 40 | 90 | 166 | 287 | 454 | 585 |
| Total wt | 975 | 2,062 | 5,941 | 6,747 | 10,654 | 13,843 |
| Avg. wt | 39.00 | 89.65 | 171.34 | 293.34 | 426 | 601.86 |

The total food consumption for the above group for the time period of the test was 75 pounds.

GROUP III

| Bird No. | Weighing dates and weights in grams | | | | | |
|---|---|---|---|---|---|---|
| | 10/18 | 10/25 | 11/1 | 11/8 | 11/15 | 11/22 |
| 1 | 43 | 88 | 176 | 293 | 454 | 596 |
| 4 | 43 | 88 | 165 | 282 | 450 | 602 |
| 6 | 39 | 94 | 176 | 282 | 460 | 612 |
| 11 | 41 | 99 | 188 | 318 | 510 | 680 |
| 14 | 39 | 86 | 166 | 283 | 458 | 630 |
| 18 | 44 | 88 | 170 | 282 | 414 | 540 |
| 21 | 38 | 95 | 176 | 290 | 454 | 586 |
| 22 | 38 | 80 | 158 | 262 | 402 | 515 |
| 31 | 44 | 96 | 176 | 265 | 425 | 572 |
| 33 | 39 | 93 | 188 | 308 | 514 | 718 |
| 34 | 41 | 85 | 164 | 269 | 418 | 550 |
| 36 | 35 | 86 | 175 | 288 | 454 | 588 |
| 49 | 42 | 98 | 183 | 315 | 496 | 664 |
| 54 | 41 | 97 | 196 | 336 | 526 | 712 |
| 55 | 41 | 98 | 183 | 305 | 472 | 648 |
| 57 | 44 | 94 | 185 | 315 | 488 | 630 |
| 58 | 37 | 94 | 183 | 325 | 508 | 685 |
| 60 | 38 | 95 | 175 | 286 | 455 | 590 |
| 67 | 37 | 89 | 170 | 285 | 456 | 600 |
| 77 | 41 | 106 | 202 | 335 | 535 | 705 |
| 80 | 40 | 90 | 168 | 285 | 468 | 645 |
| 84 | 40 | 93 | 175 | 296 | 445 | 566 |
| 85 | 39 | 96 | 175 | 300 | 482 | 636 |
| 86 | 35 | 66 | 190 | 300 | 504 | 705 |
| 87 | 35 | 92 | 184 | 315 | 505 | 685 |
| Total wt | 994 | 2,308 | 4,447 | 7,420 | 11,753 | 15,660 |
| Avg. wt | 39.76 | 92.32 | 117.88 | 296.8 | 470 | 626.40 |

The total food consumption for the above group for the time period of the test was 79 pounds.

GROUP IV

| Bird No. | Weighing dates and weights in grams | | | | | |
|---|---|---|---|---|---|---|
| | 10/18 | 10/25 | 11/1 | 11/8 | 11/15 | 11/22 |
| 7 | 40 | 102 | 160 | 264 | 432 | 568 |
| 8 | 38 | 78 | 150 | 252 | 422 | 582 |
| 9 | 35 | 86 | 170 | 298 | 465 | 595 |
| 12 | 44 | 84 | 184 | 302 | 482 | 624 |
| 17 | 41 | 98 | 182 | 332 | 516 | 562 |
| 19 | 40 | 96 | 180 | 298 | 472 | 528 |
| 20 | 36 | 85 | 170 | 306 | 496 | 660 |
| 23 | 41 | 89 | 190 | 342 | 545 | 700 |
| 25 | 37 | 76 | 155 | 282 | 470 | 665 |
| 27 | 40 | 92 | 166 | 280 | 435 | 556 |
| 28 | 40 | 100 | 185 | 310 | 485 | 642 |
| 29 | 37 | 95 | 194 | 325 | 514 | 670 |
| 32 | 38 | 78 | 150 | 264 | 408 | 415 |
| 39 | 45 | 104 | 186 | 325 | 525 | 705 |
| 41 | 38 | 84 | 165 | 293 | 466 | 600 |
| 52 | 41 | 103 | 188 | 304 | 482 | 605 |
| 56 | 42 | 95 | 175 | 298 | 482 | 605 |
| 62 | 40 | 96 | 166 | 295 | 446 | 580 |
| 63 | 37 | 69 | 140 | 256 | 422 | 585 |
| 70 | 38 | 99 | 188 | 316 | 495 | 648 |
| 74 | 38 | 88 | 165 | 292 | 390 | 480 |
| 91 | 38 | 82 | 154 | 265 | 416 | 526 |
| 92 | 42 | 101 | 186 | 318 | 476 | 614 |
| 99 | 41 | 88 | 170 | 285 | 436 | 562 |
| 100 | 35 | 76 | 140 | 224 | 375 | 460 |
| Total wt | 982 | 2,253 | 4,269 | 7,326 | 11,536 | 14,857 |
| Avg. wt | 39.28 | 90.12 | 170.76 | 393.04 | 461 | 594.28 |

The total food consumption for the above group for the time period of the test was 79 pounds.

EXAMPLE V

Purpose: To determine the value of Cobalt Arsanilate in the prevention of roundworm (*Ascaridia galli*), cecal worms (Heterakis) and blackhead.

Procedure: 79-day-old turkey poults were received May 9, 1964, wingbanded, weighed, and divided into four groups.

Medication:

Group I—Straight feed control 100 lbs.
Group II—11.3 grams cobalt Arsanilate in 100 lbs. feed.
Group III—16.9 grams cobalt arsanilate in 100 lbs. feed.
Group IV—22.7 grams cobalt arsanilate in 100 lbs. feed Feed formula:

| | Gm. |
|---|---|
| Fish meal | 25 |
| Ground yellow corn | 150 |
| Ground oats | 25 |
| Wheat bran | 50 |
| Wheat middlings | 50 |
| Alfalfa meal | 25 |
| Soybean meal | 100 |
| Meat meal | 25 |
| Dry milk | 25 |
| Ground limestone | 10 |
| Iodized salt | 3 |
| Choline | 60 |
| Vitamin A, I.U. | 2,000,000 |
| Vitamin $D_3$, I.U. | 300,000 |
| Riboflavin | 1 |
| Niacin | 5 |
| Cal. pantothenate | 1 |
| Vitamin E, I.U. | 10,000 |

Infection: All turkeys given embryonated *Ascaridia galli* and Heterakis at 7 and 14 days of age.

The control group made a gain of 24 lbs. on 68½ lbs. of feed or 1 lb. gain to 2.8 lbs. feed.

Group II—½ lb. cobalt arsanilate per ton gained 29 lbs. on 66 lbs. feed or 1 lb. gain to 2.6 lbs. feed or 20% increase in weight.

Group III—¾ lb. cobalt arsanilate per ton gained 34 lbs. on 77 lbs. feed or 1 lb. gain to 2.2 lbs. feed or 41% increase in weight.

Group IV.—1 lb. cobalt arsanilate per ton gained 35 lbs. on 88 lbs. feed or 1 lb. gain to 2.4 lbs. feed or 45% increase in weight.

GROUP I

| Bird No. | Weighing dates and weights in grams | | | | | | |
|---|---|---|---|---|---|---|---|
| | 5/9 | 5/16 | 5/22 | 5/29 | 6/5 | 6/12 | 6/19 |
| 801 | 49 | 85 | 108 | 205 | 343 | 514 | 719 |
| 802 | 52 | 76 | 104 | 182 | 297 | 455 | 667 |
| 803 | 52 | 94 | 126 | 210 | 319 | 510 | 740 |
| 804 | 50 | 76 | 82 | Died 5/25 Blackhead | | | |
| 805 | 55 | 78 | 134 | 230 | 379 | 596 | 865 |
| 806 | 58 | 105 | 165 | 286 | 420 | 512 | 872 |
| 807 | 50 | 84 | 122 | 176 | 273 | 422 | 648 |
| 808 | 48 | 80 | 107 | 170 | 263 | 391 | 556 |
| 809 | 44 | 75 | 118 | 218 | 343 | 534 | 788 |
| 810 | 52 | 72 | 96 | 155 | 242 | 388 | 604 |
| 811 | 50 | 55 | | Died 5/22 Enteritis | | | |
| 812 | 49 | 90 | 132 | 210 | 329 | 594 | 724 |
| 813 | 55 | 88 | 108 | 162 | 278 | 435 | 650 |
| 814 | 49 | 60 | 82 | 122 | 211 | 326 | 488 |
| 815 | 50 | 78 | 112 | 172 | 263 | 418 | 682 |
| 816 | 51 | 84 | | Died 5/19 decomposed | | | |
| 817 | 44 | 88 | 151 | 248 | 342 | 451 | 590 |
| 818 | 55 | 96 | 155 | 254 | 394 | 608 | 919 |
| 819 | 53 | 84 | 140 | 240 | 325 | 458 | 605 |
| 820 | 52 | 84 | 132 | 230 | 374 | 556 | 806 |
| Total wt | 1,018 | 1,633 | 2,174 | 3,470 | 5,395 | 8,168 | 11,923 |
| Avg | 50.90 | 81.65 | 120 | 204.11 | 317.35 | 480.47 | 701.35 |

The total feed consumption for the above group for the time period of the test was 76¾ pounds.

GROUP II

| Bird No. | Weighing dates and weights in grams | | | | | | |
|---|---|---|---|---|---|---|---|
| | 5/9 | 5/16 | 5/22 | 5/29 | 6/5 | 6/12 | 6/19 |
| 821 | 51 | 90 | 140 | 252 | 414 | 596 | 830 |
| 822 | 54 | 88 | 152 | 285 | 480 | 727 | 1,020 |
| 823 | 53 | | Died 5/13 Sac Infection | | | | |
| 824 | 56 | 95 | 166 | 305 | 510 | 746 | 1,024 |
| 825 | 59 | 86 | 145 | 230 | 352 | 514 | 706 |
| 826 | 52 | 62 | 92 | 156 | 262 | 411 | 603 |
| 827 | 53 | 82 | 108 | 194 | 327 | 530 | 780 |
| 828 | 54 | 78 | 122 | 196 | 333 | 560 | 660 |
| 829 | 50 | 75 | 138 | 262 | 392 | 587 | 862 |
| 830 | 48 | | Died 5/12 of Navel Infection | | | | |
| 831 | 54 | 95 | 148 | 265 | 453 | 640 | 905 |
| 832 | 54 | 93 | 156 | 255 | 361 | 550 | 805 |
| 833 | 52 | 74 | 95 | 170 | 301 | 468 | 671 |
| 834 | 47 | 68 | 102 | 145 | 218 | 338 | 510 |
| 835 | 52 | 86 | 146 | 260 | 419 | 663 | 934 |
| 836 | 44 | 66 | 110 | 180 | 309 | 485 | 710 |
| 837 | 53 | 55 | 99 | 126 | 198 | 318 | 512 |
| 838 | 52 | 86 | 125 | 194 | 316 | 469 | 680 |
| 839 | 53 | 66 | 104 | 185 | 298 | 480 | 725 |
| 840 | 48 | 95 | 162 | 282 | 491 | 728 | 1,034 |
| Total wt | 1,034 | 1,440 | 2,310 | 3,942 | 6,434 | 9,810 | 14,171 |
| Avg | 51.70 | 80.00 | 122.7 | 219 | 357.44 | 545.00 | 787.27 |

The total feed consumption for the above group for the time period of the test was 76 pounds.

GROUP III

| Bird No. | Weighing dates and weights in grams | | | | | | |
|---|---|---|---|---|---|---|---|
| | 5/9 | 5/16 | 5/22 | 5/29 | 6/5 | 6/12 | 6/19 |
| 841 | 44 | 85 | 135 | 225 | 382 | 610 | 910 |
| 842 | 54 | 96 | 136 | 230 | 340 | 496 | 712 |
| 843 | 56 | 85 | 135 | 225 | 364 | 550 | 766 |
| 844 | 54 | 88 | 164 | 282 | 460 | 695 | 1,002 |
| 845 | 51 | 75 | 112 | 200 | 362 | 568 | 812 |
| 846 | 64 | 105 | 162 | 266 | 439 | 670 | 970 |
| 847 | 60 | 108 | 183 | 315 | 507 | 739 | 1,032 |
| 848 | 50 | 82 | 135 | 242 | 381 | 573 | 810 |
| 849 | 52 | 78 | 124 | 190 | 284 | 431 | 629 |
| 850 | 56 | 93 | 142 | 245 | 375 | 568 | 795 |
| 851 | 55 | 85 | 142 | 188 | 315 | 527 | 782 |
| 852 | 50 | 96 | 168 | 285 | 505 | 757 | 1,065 |
| 853 | 52 | 92 | 156 | 285 | 484 | 747 | 1,058 |
| 854 | 52 | 96 | 155 | 266 | 415 | 657 | 906 |
| 855 | 49 | 85 | 155 | 275 | 474 | 738 | 1,011 |
| 856 | 54 | 82 | 140 | 218 | 330 | 518 | 775 |
| 857 | 54 | 105 | 182 | 312 | 527 | 807 | 1,130 |
| 858 | 58 | 98 | 172 | 300 | 517 | 778 | 825 |
| 859 | 49 | 96 | 168 | | Died injury | | |
| 860 | 50 | 85 | 125 | 208 | 352 | 525 | 769 |
| Total wt | 1,064 | 1,815 | 3,011 | 7,457 | 7,813 | 11,954 | 16,759 |
| Avg | 53.20 | 90.75 | 150.5 | 250.36 | 411.21 | 629.15 | 882.15 |

The total feed consumption for the above group for the time period of the test was 76¾ pounds.

GROUP IV

| Bird No. | Weighing dates and weights in grams | | | | | | |
|---|---|---|---|---|---|---|---|
| | 5/9 | 5/16 | 5/22 | 5/29 | 6/5 | 6/12 | 6/19 |
| 861 | 55 | 96 | 166 | 305 | 494 | 754 | 1,078 |
| 862 | 49 | 86 | 150 | 255 | 423 | 633 | 932 |
| 863 | 43 | 75 | 122 | 205 | 345 | 551 | 802 |
| 864 | 54 | 88 | 166 | 305 | 521 | 808 | 1,158 |
| 865 | 55 | 100 | 180 | 330 | 529 | 800 | 1,133 |
| 866 | 52 | 85 | 138 | 242 | 390 | 550 | 745 |
| 867 | 58 | 96 | 178 | 244 | 420 | 656 | 1,000 |
| 868 | 55 | 88 | 160 | 275 | 446 | 669 | 950 |
| 869 | 52 | 82 | 138 | 235 | 374 | 589 | 880 |
| 870 | 58 | 104 | 192 | 325 | 525 | 828 | 1,186 |
| 871 | 55 | 90 | 153 | 276 | 444 | 653 | 917 |
| 872 | 56 | 86 | 158 | 275 | 411 | 633 | 966 |
| 873 | 61 | 96 | 156 | 250 | 357 | 555 | 668 |
| 874 | 62 | 108 | 193 | 310 | 495 | 763 | 1,126 |
| 875 | 58 | 95 | 175 | 315 | 522 | 764 | 1,078 |
| 876 | 55 | 100 | 152 | 230 | 377 | 551 | 790 |
| 877 | 52 | 86 | 140 | 235 | 382 | 488 | 760 |
| 878 | 46 | 86 | 142 | 245 | 425 | 664 | 970 |
| 879 | 45 | Died 5/12 Navel Infection | | | | | |
| 880 | 1 short | | | | | | |
| Total wt | 1,021 | 1,647 | 2,859 | 4,857 | 7,880 | 11,909 | 17,139 |
| Avg | 53.73 | 91.50 | 158.8 | 269.83 | 437.77 | 661.61 | 952.16 |

The total feed consumption for the above group for the time period of the test was 88 pounds.

EXAMPLE VI

This experiment was conducted to determine the value of cobalt arsanilate for the prevention of Ascaris (roundworm) and growth stimulation when administered at ½ and 1 lb. per ton to pigs. Three litters of pigs farrowed the week of May 25 were divided into three groups and given the following feed:

Group I—1 lb. of cobalt arsanilate per ton of usual feed;

Group II—½ lb. cobalt arsanilate per ton of usual feed;

Group III—given the same feed without cobalt arsanilate.

The hogs in all three groups were fed embryonated Ascaris eggs July 1 and 7. All pigs were vaccinated with Pasteurella Corynebacterium bacterin and erysipelas bacterin on July 1. On August 1, the males were castrated and all vaccinated with blood origin—inactivated hog cholera vaccine. There were four females and three males in each group.

By October 1, group 1 had gained 2 lbs. more per pig than group III, while group II had gained 11 lbs. more per pig than group III. The animals were continued on the same feed until October 24, then taken off medication and slaughtered on the 30th. During the last month, the hogs on the higher dosage of cobalt arsanilate gained weight at a considerably reduced rate, and at the time of slaughtering were 13 lbs. lighter than the controls. Those in group II at the end of the growth period had outgained the controls by 8 lbs. per pig. Group I gained 1 lb. per 3.1 lbs. of food; group II gained 1 lb. per 2.7 lbs. of food; while the control group gained 1 lb. per 3.2 lbs. of food. On postmortem examination 46 Ascaris were found in group III, 40 in group II, and zero in group I. The greater dosage thus showed 100% complete roundworm control, while great stimulation was shown at the intermediate level.

EXAMPLE VII.—GROWTH STIMULATION CHICKENS

| | Day old | Week 1 | Week 2 | Week 3 | Week 4 | Week 5 | Week 6 | Lbs. gain | Lbs. feed/ lb. gain |
|---|---|---|---|---|---|---|---|---|---|
| Cobalt arsenate: | | | | | | | | | |
| Control | 35 | 68 | 127 | 229 | 360 | | | 17 | 2.0 |
| ½#/ton-treated | 36 | 63 | 117 | 198 | 305 | | | 14 | 2.4 |
| ¼#/ton-treated | 38 | 66 | 119 | 218 | 322 | 442 | 578 | 22 | 3.4 |
| Control | 38 | 68 | 130 | 225 | 325 | 456 | 589 | 30.3 | 2.5 |
| Cobalt arsanilate: | | | | | | | | | |
| Control | 35 | 68 | 127 | 228 | 360 | | | 17 | 2.0 |
| ½#/ton-treated | 37 | 73 | 133 | 236 | 364 | | | 18 | 1.9 |
| Control | 39 | 68 | 122 | 217 | 322 | | | 16.5 | 2.1 |
| ½#/ton-treated | 40 | 67 | 125 | 215 | 337 | | | 17 | 2.0 |
| Control | 38 | 84 | 128 | 245 | 376 | 508 | | 27.5 | 2.7 |
| ½#/ton-treated | 37 | 80 | 128 | 261 | 422 | 608 | | 31.4 | 2.4 |
| Control | 39 | 90 | 171 | 293 | 461 | 594 | | 30.5 | 2.6 |
| 45 gm./ton-treated | 40 | 92 | 171 | 296 | 461 | 605 | | 31 | 2.5 |
| 90 gm./ton-treated | 39 | 90 | 171 | 293 | 463 | 602 | | 28.3 | 2.6 |
| 180 gm./ton-treated | 40 | 92 | 178 | 297 | 470 | 623 | | 32.3 | 2.4 |
| Control | 36 | 67 | 138 | 234 | 382 | 542 | 732 | 25.4 | 2.4 |
| ¾#/ton-treated | 34 | 71 | 143 | 248 | 426 | 595 | 818 | 28.8 | 2.4 |
| 1#/ton-treated | 35 | 76 | 157 | 254 | 435 | 606 | 833 | 31.1 | 2.4 |
| Control | 41 | 91 | 185 | 304 | 468 | 654 | | 32.3 | 2.4 |
| 1#/ton-treated | 43 | 93 | 191 | 314 | 490 | 673 | | 33.3 | 2.4 |
| Control | 41 | 97 | 171 | 305 | 491 | 711 | | 32.2 | 2.4 |
| ½#/ton-treated | 43 | 93 | 171 | 297 | 495 | 718 | | 32.6 | 2.6 |
| Control | 35 | 71 | 126 | 217 | 327 | 454 | | 22 | 3.1 |
| 1#/ton-treated | 35 | 71 | 126 | 210 | 316 | 451 | | 22 | 2.9 |
| Control | 34 | 69 | 123 | 203 | 302 | 432 | 595 | 28 | 2.9 |
| 1#/ton-treated | 34 | 68 | 124 | 214 | 328 | 469 | 642 | 33.9 | 2.6 |
| GROWTH STIMULATION TURKEYS | | | | | | | | | |
| Cobalt arsanilate: | | | | | | | | | |
| Control | 51 | 82 | 120 | 204 | 317 | 480 | 701 | 24 | 2.8 |
| ½#/ton-treated | 52 | 80 | 123 | 219 | 357 | 545 | 787 | 29 | 2.6 |
| ¾#/ton-treated | 53 | 91 | 151 | 250 | 411 | 629 | 882 | 34 | 2.2 |
| 1#/ton-treated | 54 | 92 | 159 | 270 | 438 | 662 | 952 | 35 | 2.4 |

Example I shows a partial kill of roundworms using the cobalt salt of arsanilic acid at one-half pound per ton of feed. This is a rather small concentration of the therapeutic agent. Example II is also an experiment at one-half pound per ton but substitutes cobalt arsenate. Here again a partial kill of the roundworms is seen at one-half pound per ton for cobalt arsanilate and one-fourth pound per ton for cobalt arsenate. Example III shows a gain in kill as the concentration goes up to one pound per ton. The sodium arsanilate proved worthless. Example IV shows the results from increasing the dosage from 45 to 180 grams per ton. Here the growth promotion is reported and is shown to be satisfactory. Example V shows a control of 2.8 pounds feed to one pound gain in weight. At one-half pound cobalt arsanilate, this value dropped to 2.6, a distinct gain over the control. At three-fourths pound per ton, the figure goes down to 2.2. At one pound per ton of cobalt arsanilate, a value of 2.4 was obtained. Example VI shows the result in the case of pigs.

Example VII shows a considerable study of growth stimulation over a period of six weeks. In many instances, it will be noted, significant weight increases were obtained but in other instances, such increases were not significant. Control of roundworms was effective, nevertheless, and why weight gains were sometimes obtained and sometimes were not is not fully understood. It appears, however, if cobalt arsenate is used rather than cobalt arsanilate, that weight gain is less likely.

What is claimed is:
1. A method for treating animals having roundworms which comprises orally administering to said animals the composition of a carrier selected from the group consisting of feed and water and containing from about 0.25 to 1.00 lbs. per ton of said carrier of a compound selected from the group consisting of cobalt arsenate, cobalt arsanilate and cobalt phenyl arsonate.

References Cited

Veter Bulletin, 33 pp. 204–205 (1963).

Organic Arsenical Compounds, Raiziss et al., pp. 240–243 and 257–259 (1923).

Foster: The Yearbook of Agriculture, pp. 83–84 (1950).

ALBERT T. MEYERS, Primary Examiner

STANLEY J. FRIEDMAN, Assistant Examiner